US012587997B2

(12) United States Patent
Zhang et al.

(10) Patent No.: US 12,587,997 B2
(45) Date of Patent: Mar. 24, 2026

(54) HIGH-PRECISION SPATIO-TEMPORAL TRAJECTORY RECOVERY METHOD BASED ON CELL PHONE SIGNALING DATA

(71) Applicant: NANJING UNIVERSITY OF POSTS AND TELECOMMUNICATIONS, Nanjing (CN)

(72) Inventors: Dengyin Zhang, Nanjing (CN); Yining Kang, Nanjing (CN); Fei Ding, Nanjing (CN); Haitao Zhang, Nanjing (CN)

( * ) Notice: Subject to any disclaimer, the term of this patent is extended or adjusted under 35 U.S.C. 154(b) by 311 days.

(21) Appl. No.: 18/497,753

(22) Filed: Oct. 30, 2023

(65) Prior Publication Data

US 2024/0276446 A1 Aug. 15, 2024

Related U.S. Application Data

(63) Continuation of application No. PCT/CN2023/122651, filed on Sep. 28, 2023.

(30) Foreign Application Priority Data

Feb. 9, 2023 (CN) .......................... 202310091610.6

(51) Int. Cl.
*H04W 64/00* (2009.01)
*G01S 5/02* (2010.01)
(52) U.S. Cl.
CPC ......... *H04W 64/006* (2013.01); *G01S 5/0294* (2013.01)

(58) Field of Classification Search
CPC .......................... H04W 64/006; G01S 5/0294
USPC ......................................................... 455/456
See application file for complete search history.

(56) References Cited

U.S. PATENT DOCUMENTS

| | | | | |
|---|---|---|---|---|
| 9,584,981 | B2 * | 2/2017 | Noorshams | .......... G01C 21/206 |
| 9,720,099 | B1 * | 8/2017 | Ekambaram | ............ G01S 19/42 |
| 10,595,164 | B2 * | 3/2020 | Mappus | .............. G01S 5/02529 |
| 10,715,964 | B1 * | 7/2020 | Burcham | .............. H04W 4/027 |
| 12,464,318 | B2 * | 11/2025 | Edge | ..................... H04L 5/0051 |
| 2016/0205504 | A1 * | 7/2016 | Chen | ..................... H04W 64/00 |
| | | | | 455/456.1 |
| 2019/0250242 | A1 * | 8/2019 | Lawitzky | ............ G01S 5/02213 |
| 2020/0187149 | A1 * | 6/2020 | Zhu | ........................ H04W 76/11 |

(Continued)

FOREIGN PATENT DOCUMENTS

| | | | |
|---|---|---|---|
| CN | 111144452 A | 5/2020 |
| CN | 111582948 A | 8/2020 |
| CN | 113613174 A | 11/2021 |

*Primary Examiner* — Jinsong Hu

(57) ABSTRACT

The present application belongs to the field of intelligent transportation technology, and in particular to a high-precision spatio-temporal trajectory recovery method based on cell phone signaling data, using a density clustering algorithm to pre-process original cell phone signaling data, using a grid clustering algorithm that fuses spatio-temporal features, introducing POI data from Baidu maps, and carrying out a clustering analysis from the spatio-temporal two dimensions, extracting a plurality of staying points of the signaling user, and then reconstructing a signaling user's travel trajectory based on the staying points, the method provided by the present application enables the user's reconstructed trajectory to have a higher degree of precision, and is more closely fitted to the user's real trajectory.

3 Claims, 8 Drawing Sheets

(56) References Cited

U.S. PATENT DOCUMENTS

2020/0322916 A1* 10/2020 Ta ......................... H04W 24/10
2023/0341228 A1* 10/2023 Gao ...................... G01C 21/28

* cited by examiner

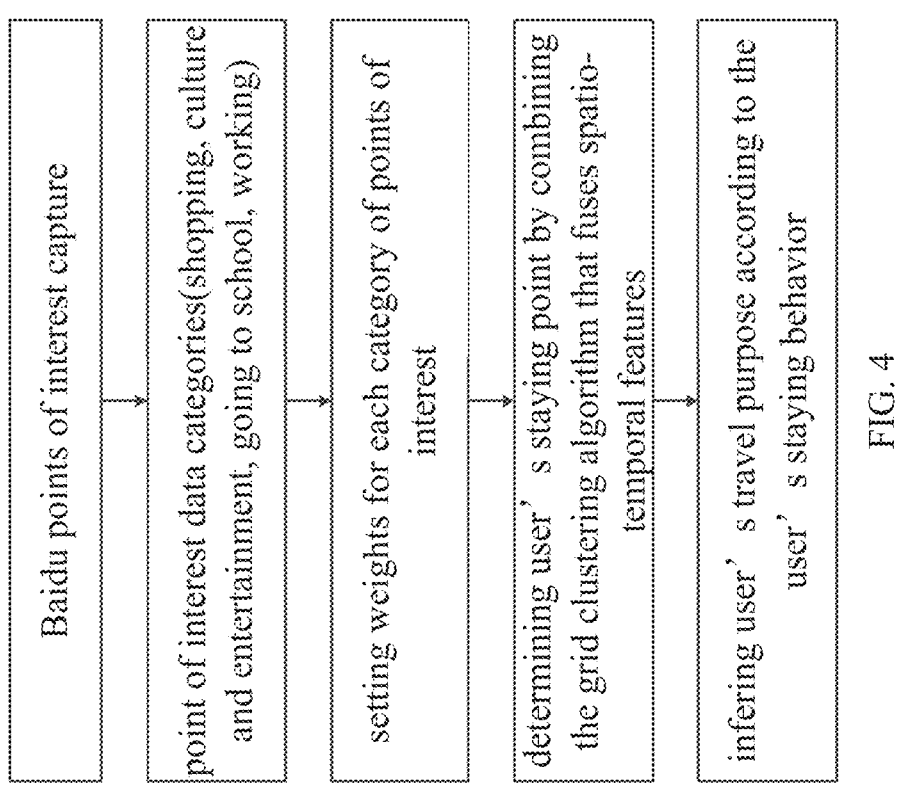

Baidu points of interest capture point of interest data categories(shopping, culture and entertainment, going to school, working)

setting weights for each category of points of interest determining user's staying point by combining the grid clustering algorithm that fuses spatio-temporal features infering user's travel purpose according to the user's staying behavior

FIG. 4

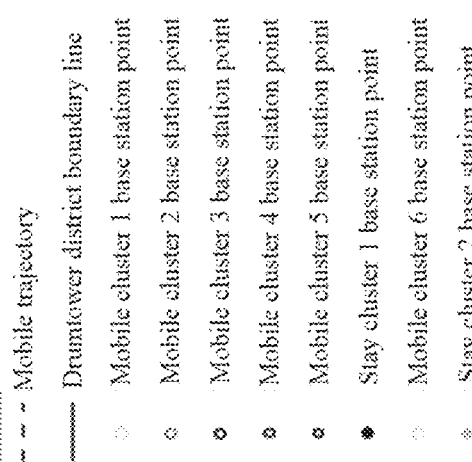
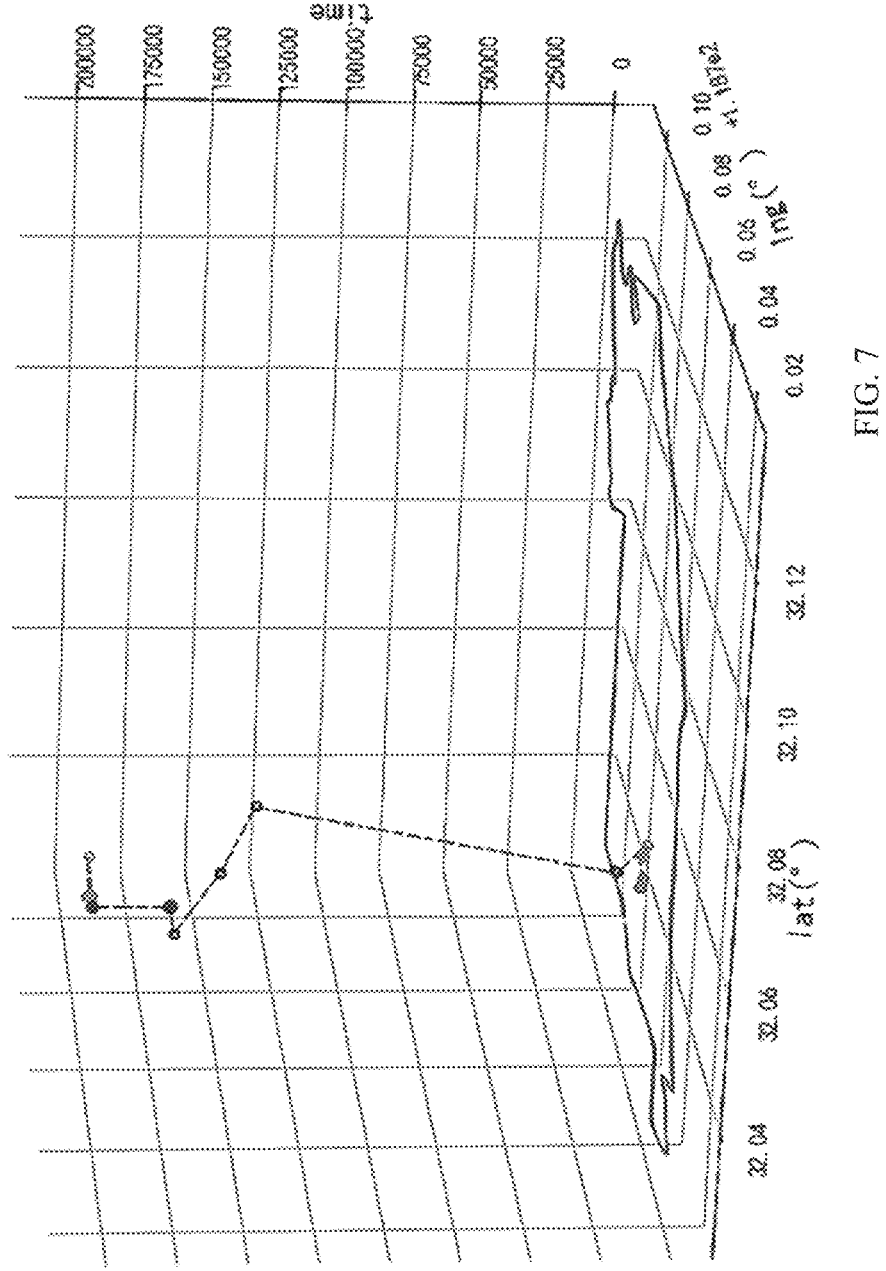
FIG. 7

HIGH-PRECISION SPATIO-TEMPORAL TRAJECTORY RECOVERY METHOD BASED ON CELL PHONE SIGNALING DATA

CROSS-REFERENCE TO RELATED APPLICATIONS

This application claims priority to Chinese Patent Application No. 202310091610.6, filed on Feb. 9, 2023, the entire disclosures of which are incorporated herein by reference.

TECHNICAL FIELD

The present application belongs to the field of intelligent transportation technology, and in particular to a high-precision spatio-temporal trajectory recovery method based on cell phone signaling data.

BACKGROUND

Signaling data is provided by the operator, which is a kind of anonymous and desensitized data, with a large amount of data and low acquisition cost, and cell phone signaling data has very prominent applications in many aspects, especially for the identification of staying points, which is a key link in the analysis of user's behaviors, and has an important impact on the analysis of the subsequent travel behavior, the travel purpose, and the analysis of behavioral prediction and other work. Therefore, the identification of staying points is a classic problem in the field of signaling research and is a hot spot for researchers.

Currently, there are three commonly used staying point identification methods based on cell phone signaling data: the first is the staying point identification method based on time sequences; the second is the staying point identification method based on velocity and acceleration; and the third is the staying point identification method based on density clustering algorithm. For the trajectory reconstruction problem of signaling data users, most of the current research is to reconstruct the user trajectory with the help of time-continuous characteristics.

Among the methods proposed above, the most commonly used is the staying point identification based on density clustering algorithm. In the research of signaling data identification of user's staying points based on density clustering algorithm, there are three main types: the first one is to improve the density-based spatial clustering of application with noise (DBSCAN), which introduces time sequence based on spatial features to identify the staying points of signaling users, such as spatial time-DBSCAN (ST_DBSCAN), adjacent time-DBSCAN (AT_DBSCAN), searches for the core points with a fixed-length sliding window, defines the distance between clusters in terms of spatio-temporal proximity conditions, and specifies the merging order in terms of the size of the cluster density, such algorithms can discover staying points of arbitrary shape. This algorithm introduces time sequences features and also improves the traditional DBSCAN, but because the sampling time interval of signaling data is not uniform, so it will be greatly affected in the spatial density clustering; the second method is to fill in the signaling data by interpolation method for the uneven sampling time interval of signaling data, to make the sampling time interval of signaling data uniformly distributed, and then use the DBSCAN to identify the staying points of signaling users. However, when the interpolation method is used to fill the signaling data, two problems will inevitably be faced: first, there is a large error when the interpolation method fills the signaling data, and the user's position at a certain moment is roughly estimated and filled just to meet the uniform sampling time interval, and the credibility of the data filled by this method is low. Second, after filling the user signaling data by interpolation method, it results in an unusually large amount of data, which is easy to cause data redundancy, and causes problems such as large amount of data computation and low performance for the subsequent trajectory recovery or the study of user travel behavior; the third method is the staying point identification method based on mobility of the grid, which is to calculate the mobile speed between the grid clusters by the data domain theory to determine the mobile capability of the grid clusters after grid clustering of the signaling users, and identify the staying point of the user by defining the mobile capability threshold, this method does not need to consider whether the data sampling interval is uniform or not when spatial clustering, but there may be ping-pong data in the grid clusters that are incompletely removed in the pre-processing stage, which are characterized by frequent back and forth movement within a certain range, and there will be a large error in calculating the average speed of the grid clusters.

In the existing trajectory reconstruction method based on time continuity, when processing data with latitude and longitude data of 0 due to frequent signal loss, the user trajectory will face the problem of basic discontinuity in time, but the user may not have moved during the time of signal loss, and only considering the time continuity to reconstruct the trajectory will appear a lot of reconstruction distortions, so the reconstruction method of the trajectory for signaling data users can be improved, which cannot be limited to the time continuity.

SUMMARY

The purpose of the present application is to overcome the deficiencies of the related art and to propose a high-precision spatio-temporal trajectory recovery method based on cell phone signaling data.

The present application adopts the following technical solution:

A high-precision spatio-temporal trajectory recovery method based on cell phone signaling data, including:

using a density-based spatial clustering of application with noise (DBSCAN) to remove discrete point data, using a rule-based method to remove ping-pong data, and using a grid clustering algorithm that fuses spatio-temporal features to identify a staying point of the user, the method further including:

step 1, pre-processing original signaling data collected by an operator by using a data pre-processing method based on the DBSCAN;

step 2, using the grid clustering algorithm that fuses the spatio-temporal features to identify the staying point of the user; and step 3, after identifying the staying point of the user, removing the identified staying point data, and further reconstructing an user trajectory.

In the above step 1, there is a large amount of data such as "drift data", "ping-pong data", and "dirty" data that misses data in the original signaling data collected by the operator, and the accurate data is required in the smooth progress of the subsequent experiments, so it is necessary to pre-process the data. The specific operation process is as follows:

selecting a complete travel record of a user, and marking collected missing data as 0; after the data is visualized, if there is data with longitude or latitude of 0, since the user's travel trajectory sequence is time sequence, thus a record of 0 cannot be deleted directly. The technical solution adopted in the present application is: for the point with the record of 0, determining whether its previous timestamp record and its next timestamp record are equal, and in response to that they are equal, directly deleting a point with a record of 0, and in response to that they are not equal, replacing the point with an average value of the previous timestamp record and the next timestamp record; after removing the above data, processing drift data by using the DBSCAN, and processing the ping-pong data by using the rule-based method.

The drift data is anomalous positioning data due to the device's inability to connect to the nearest base station, and the drift data is usually not in the same or neighboring grid with the previous trajectory point, which is manifested by the inability of the previous trajectory point to continue backward in the grid. The present application adopts a method of setting time window to remove the drift data; if a trajectory point A that cannot continue to be linked backward, and there is a trajectory point B that can continue to be linked backward within the time window of a downward direction of the trajectory point A; all trajectory points between the trajectory points A and B are the drift data and removed, otherwise it continues downward to search by the time window with the previous trajectory point of a current trajectory point as a reference.

Due to the existence of overlapping areas in the coverage of the signaling cell, when the user is in the overlapping area, the ping-pong data will receive signals from multiple base stations, but it will give priority to the base station with the stronger signal for access. However, the signals in the overlapping area may be interfered by other radio waves, resulting in unstable connection with the base station, which is manifested by constantly switching base stations. Based on this, the present application grids a studied cell, maps all signaling trajectory points into a grid, sets a time threshold according to characteristics of the ping-pong data that jumps rapidly between neighboring base stations, and if the trajectory data in the grid jumps between two base stations and a time interval for the jump is less than the time threshold, determines the trajectory data to be the ping-pong data and removes the ping-pong data.

In the above step 2, the grid clustering algorithm that fuses the spatio-temporal features is used to identify the staying point of the user. The algorithm grids a studied traffic cell, maps cell phone signaling trajectory points according to a time sequence into a studied traffic cell grid; calculates user's continuous residence time in each grid; determines whether time difference between time the user leaves the grid and time the user arrives at the grid is greater than the time threshold; and if the time difference is greater than the time threshold, determining the data to be residence data, and otherwise determines the data to be travel data. For the residence data, a concept of points of interest (POI) is introduced, the POI is captured by Baidu to obtain information comprising name, type, latitude and longitude to further analyze purpose why the user resides, for subsequent study of the user's travel behavior.

Based on the above step 3, after identifying the staying point of the user, the identified staying point data can be removed, and an user trajectory is reconstructed. For the reconstructed part of the trajectory, on a basis of the identification of the user's staying point, the user's behavior is analyzed by combining road network data collected by Baidu Maps, and the user staying area and staying purpose is analyzed according to the user's POI data. To facilitate the analysis of the user's subsequent travel behavior, the user trajectory is divided into multiple sub-trajectories at equal distances; and the user's travel data features within each sub-trajectory is clustered to identify the user's whole travel mode.

Beneficial Effects of the Present Application

First, the method of recognizing the staying point of a signaling user based on time, speed, and acceleration identifies the staying point of the user based on the time characteristics, speed characteristics, and acceleration characteristics of the base station to which the signaling user is connected, but this type of method is susceptible to the influence of ping-pong data. Due to the characteristics of cell phone signaling itself and it is difficult to completely eliminate the ping-pong data in the pre-processing stage. The grid clustering algorithm that fuses spatio-temporal features proposed by the present application can better solve the above problem, the algorithm clusters signaling data in the spatial dimension, even if there are ping-pong data, these ping-pong data will be clustered into a grid cluster, so it can be effectively avoided that the impact of the ping-pong data that cannot be completely eliminated in the pre-processing stage on the recognition of signaling user staying points.

Second, compared with the density clustering algorithm based on DBSCAN and ST_DBSCAN, the algorithm proposed in the present application determines whether the trajectory point belongs to the grid cluster by calculating the distance from the signaling user's trajectory point to the center of the grid, and determines whether a resident behavior has occurred by calculating the method of calculating whether the time it stays within the grid is greater than the time threshold. Therefore, this method can effectively avoid the problem of poor clustering effect due to the uneven interval of signaling data adoption.

Third, compared with the staying point identification method based on the mobility of the grid, although the problem of unclean removal of ping-pong data in the pre-processing stage can be better solved by the grid cluster, because the definition of the size of mobility of the grid in the staying point identification method based on mobility of the grid is defined by the ratio of the average speed of the grid cluster to the speed of the movement of the front and rear trajectories of the grid cluster, and there is still a possibility that there exists data with incomplete removal of ping-pong data within the grid cluster in the pre-processing stage, so the algorithm proposed in the present application addresses the previous deficiencies by first extracting the time features of the signaling data and clustering them in the spatial dimension, thus the error caused by the ping-pong data on the identification of signaling user staying points can be effectively reduced.

Fourth, compared with the method of reconstructing the signaling trajectory based on time continuity, the present application is to reconstruct the user trajectory based on after identifying the staying point of the user, i.e., reconstructing the signaling user trajectory in the spatial dimension, so that even if the user's signal is lost and no movement occurs, we can reconstruct it without causing the trajectory distortion.

BRIEF DESCRIPTION OF THE DRAWINGS

FIG. 4 is a flowchart of POI data capturing and processing in an embodiment of the present application.

FIG. 7 is a diagram of the identification result of using a grid clustering center to represent a staying point of the user in an embodiment of the present application.

DETAILED DESCRIPTION OF THE EMBODIMENTS

In order to deepen the understanding of the present application, the present application will be described in further detail in the following in combination with the accompanying drawings and embodiments, which are only used to explain the present application and do not constitute a limitation of the scope of the present application.

Embodiment: a high-precision spatio-temporal trajectory recovery method based on cell phone signaling data, using a density-based spatial clustering of application with noise (DBSCAN) to remove discrete point data, using a rule-based method to remove ping-pong data, and using a grid clustering algorithm that fuses spatio-temporal features to identify a staying point of the user.

Figure 1:
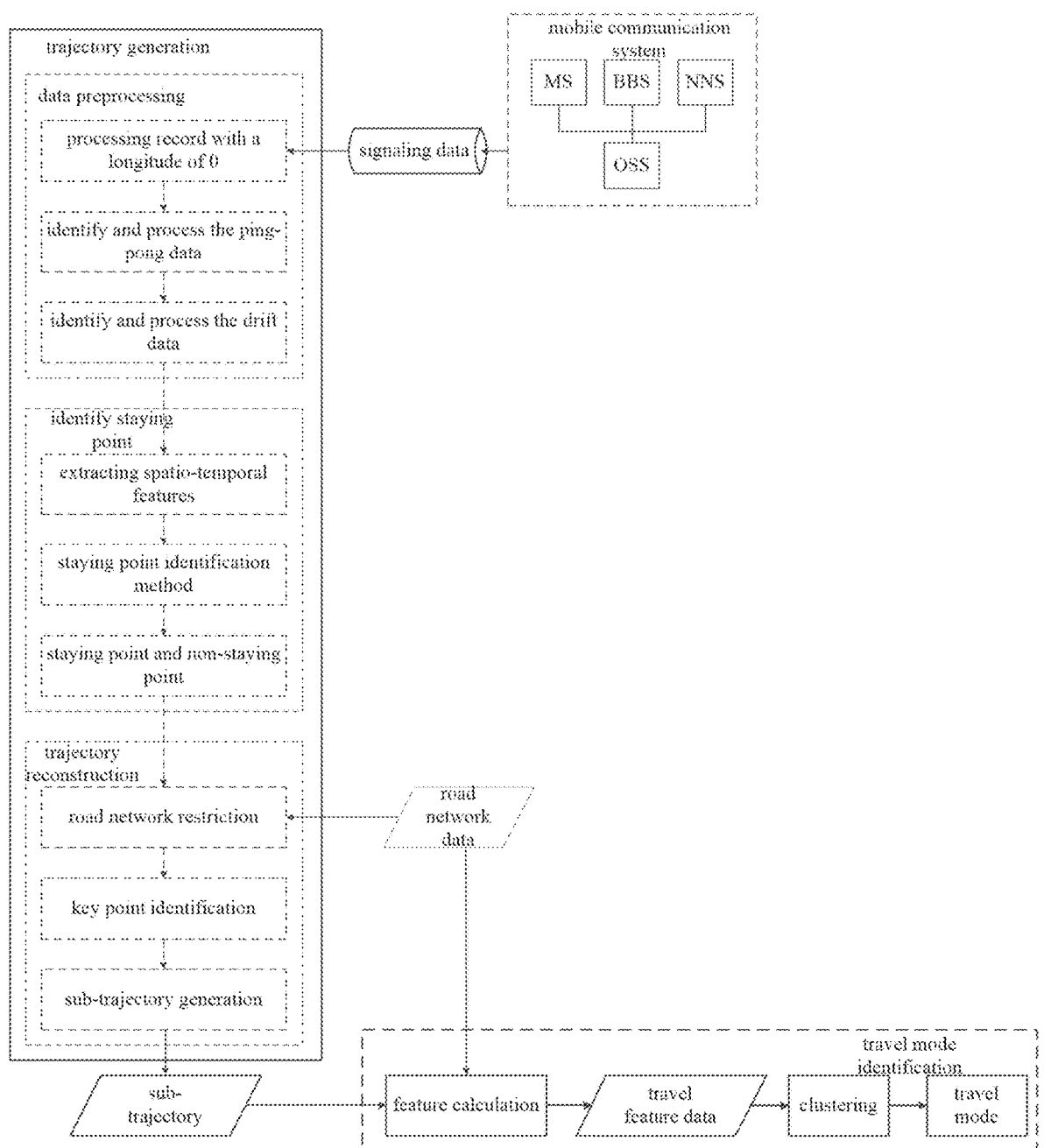
FIG. 1 is an interface diagram of an overall functional module provided in an embodiment of the present application.

In this embodiment, the proposed high-precision spatio-temporal trajectory recovery method based on cell phone signaling data mainly consists of three parts, and the overall functional module interface diagram of the method is shown in FIG. 1.

For the data pre-processing stage, its main processes include:

(1) selecting a complete travel record of a user, and marking collected missing data as 0; after the data is visualized, if there is data with longitude or latitude of 0, since the user's travel trajectory sequence is time sequence, thus a record of 0 cannot be deleted directly. The technical solution adopted in the present application is: for the point with the record of 0, determining whether its previous timestamp record and its next timestamp record are equal, and if they are equal, directly deleting a point with a record of 0, and if they are not equal, replacing the point with an average value of the previous timestamp record and the next timestamp record.

2) after removing the data with latitude and longitude of 0, the drift data is processed using the DBSCAN, and the ping-pong data is processed using a rule-based method. The present application uses the method of setting a time window to remove the drift data, if the trajectory point A cannot continue to link backward, if in the time window downward from the trajectory point A, there is a trajectory point B that can continue to link backward, then all the trajectory points between A and B are drift data and are removed, otherwise, the previous trajectory point of the current trajectory point is used as a reference, and it continues downward to search by the time window.

(3) for ping-pong data, the present application grids the studied cell, maps all signaling trajectory points into the grid, sets a time threshold according to the characteristics of ping-pong data that rapidly jumps between neighboring base stations, and if the trajectory data in the grid jumps between two base stations and the time interval for jump is less than the time threshold, then the trajectory data is determined to be ping-pong data and is removed.

For the identification of the staying point of the user, this method utilizes a grid clustering algorithm that fuses spatio-temporal features to identify staying point of the user. The idea of this algorithm is to grid the studied traffic cell, and then maps the cell phone signaling trajectory points into the studied traffic cell grid according to the time sequence, calculates the continuous residence time of the signaling user in each grid, i.e., determine whether the time difference between the time the user leaves the grid and the time the user arrives at the grid is greater than the time threshold, if it exceeds the threshold, then the data is determined to be the residence data; conversely, the data is determined to be the travel data. For the residence data, the concept of POI points of interest is introduced, and the POI points of interest data are captured by Baidu, to obtain the data information including name, type, longitude and latitude to further analyze purpose why the user resides, for subsequent study of the user's travel behavior.

For the reconstruction part of the trajectory, on the basis of the identification of staying point of the user in the previous section, combined with the road network data collected by Baidu Maps to analyze the user's behavior, the user's staying area and the staying purpose is analyzed specifically according to the user's POI data. To facilitate the analysis of the user's subsequent travel behavior, the user's trajectory can be divided into a number of sub-trajectories at equal distances, and then the user's travel data characteristics is clustered for analysis in each sub-trajectory, to identify the user's travel mode.

Figure 2:
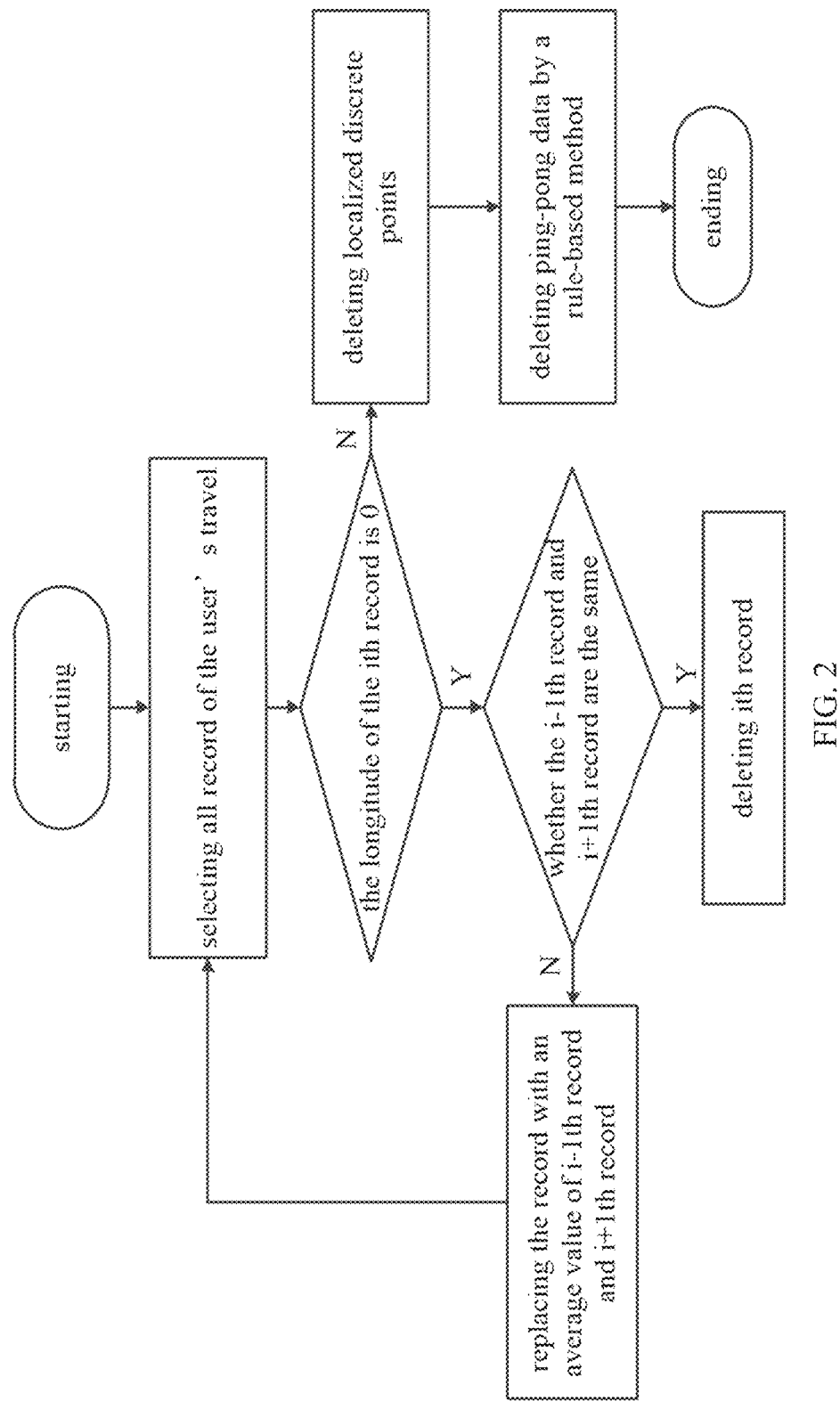
FIG. 2 is a flowchart of the pre-processing module in an embodiment of the present application.

For the first part of the data pre-processing module, the specific flowchart of its implementation is shown in FIG. 2. The complete travel record of a signaling user is selected, and the collected missing data is marked as 0. After the data is visualized, if there is data with longitude or latitude of 0, since the user's travel trajectory sequence is time sequence, thus a record of 0 cannot be deleted directly. The technical solution adopted in the present application is: for the point with the record of 0, determining whether its previous timestamp record and its next timestamp record are equal, and if they are equal, directly deleting a point with a record of 0, and if they are not equal, replacing the point with an average value of the previous timestamp record and the next timestamp record. After removing the above data, the drift data is processed by using the DBSCAN, and the ping-pong data is processed by using the rule-based method. The present application adopts a method of setting time window to remove the drift data; if a trajectory point A that cannot continue to be linked backward, and there is a trajectory point B that can continue to be linked backward within the time window of a downward direction of the trajectory point A; all trajectory points between the trajectory points A and B are the drift data and removed, otherwise it continues downward to search by the time window with the previous trajectory point of a current trajectory point as a reference. For ping-pong data, the present application grids the studied cell, maps all signaling trajectory points into the grid, sets a time threshold according to the characteristics of ping-pong data that jumps rapidly between neighboring base stations, and if the trajectory data in the grid jumps between two base stations and the time interval for the jump is less than the time threshold, then determines the trajectory data to be ping-pong data and removes the ping-pong data.

The specific steps of DBSCAN for processing discrete point data are as follows:

1) arbitrarily selecting a trajectory point p;

2) finding all trajectory points where eps and minPts densities are reachable from the trajectory point p;

3) if the trajectory point p is a center point, forming a cluster; if the trajectory point p is a boundary point, there is no object where the density is reachable from the trajectory point p, using the DBSCAN continuedly to access other trajectory points in a dataset; and 4) continuing this process until all trajectory points in the dataset have been processed.

The radius eps determines the search space of the core objects, and the minPts density threshold determines the core objects in the clustering process. The eps value too small may make DBSCAN designate useful data as noise, the eps value too large may make DBSCAN add noisy data to the cluster, such that it is difficult for DBSCAN to obtain good results when clustering data of uneven density distribution, so it is necessary to select the appropriate radius eps value in order to remove the trajectory point data of the discrete points in the dataset to reduce the error of the subsequent experiments.

Figure 3A:
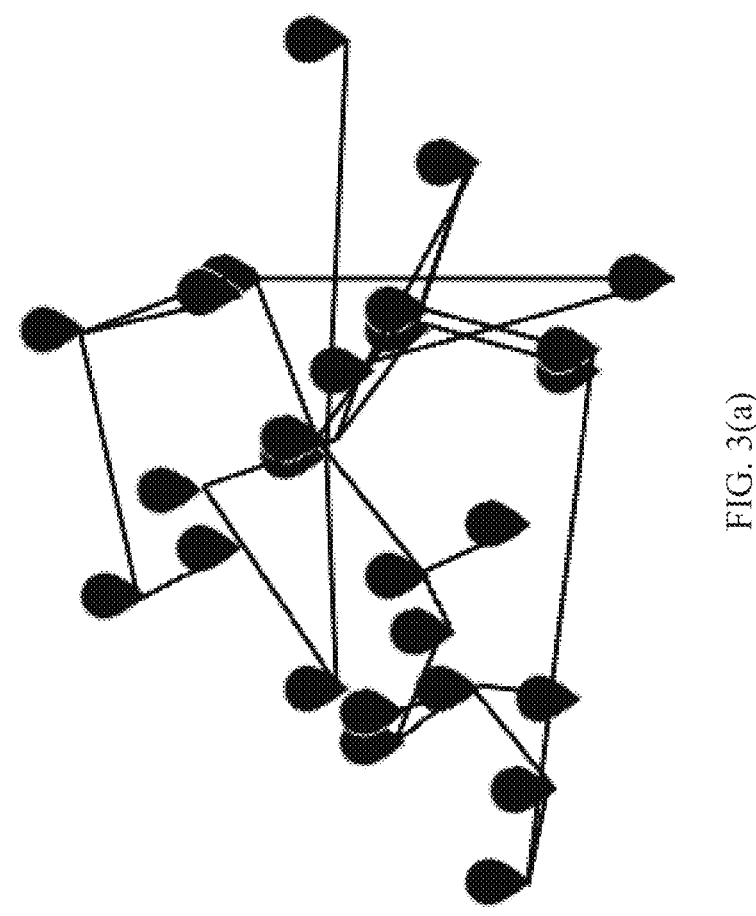
FIG. 3A is a complete trajectory diagram of before pre-processing a user signaling data in an embodiment of the present application.
Figure 3B:
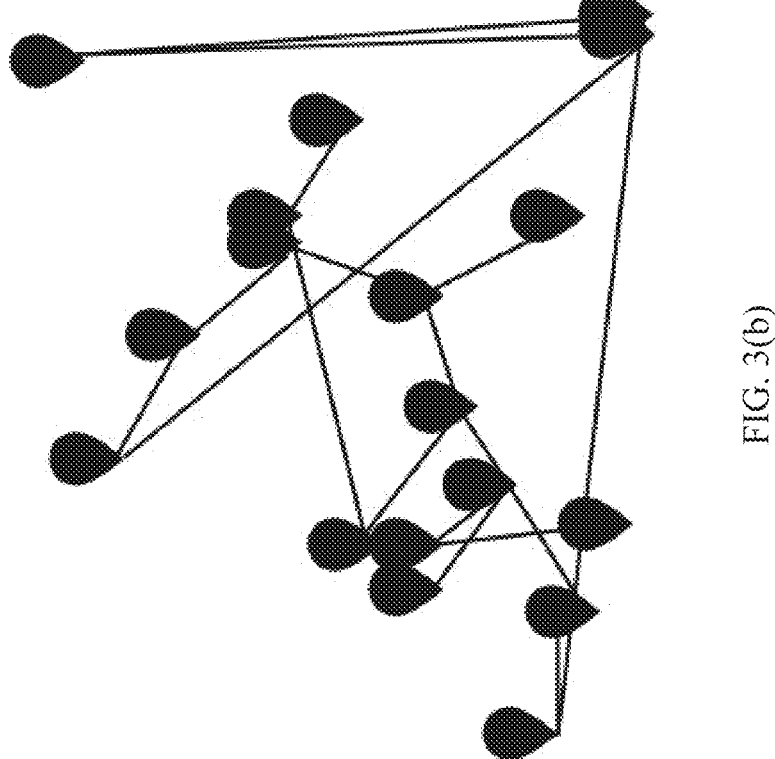
FIG. 3B is a complete trajectory diagram of after pre-processing user signaling data in an embodiment of the present application.

FIG. 3A is the complete mobile trajectory of a signaling user without data pre-processing, and FIG. 3B is the complete mobile trajectory of this user after pre-processing, and it is found by comparison that the signaling data pre-processing module removes part of the ping-pong data and all of the drift data.

For the identification of the second part of the staying point, the present application proposes a grid clustering algorithm that fuses spatio-temporal features, grids the residential travel area, and identifies the signaling user's staying point by combining the points of interest (POI) data captured by Baidu map. The flowchart of POI data capturing and processing is shown in FIG. 4. Baidu point of interest capture program is used to capture all the points of interest of signaling users, and the captured points of interest are composed of four parts: name, type, longitude, latitude, and are divided into four major categories of topics according to the point of interest data categories, such as shopping, culture and entertainment, going out for work, and going to school for students, etc., and appropriate weights are set for each category of points of interest, and then grid clustering algorithms are utilized for the identification of users' staying points. The identified data within the staying grid clusters are analyzed and combined with the POI data to further analyze the user's staying area and staying purpose, so as to infer the user's overall travel purpose.

Figure 5:
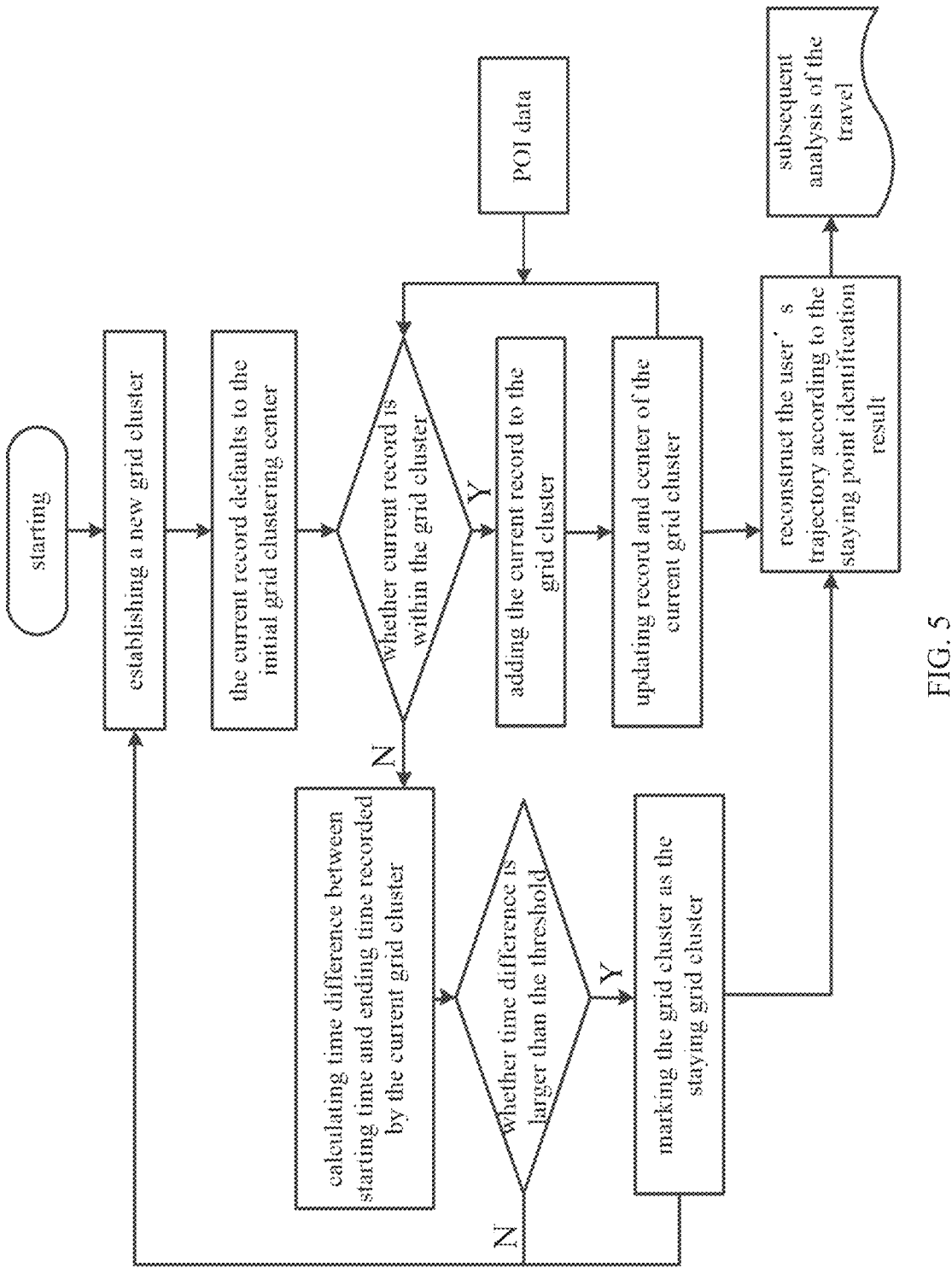
FIG. 5 is a flowchart of the grid clustering algorithm that fuses spatio-temporal features to identify a user's staying point in an embodiment of the present application.

The flowchart of the grid clustering algorithm that fuses spatio-temporal features to identify the user's staying point is shown in FIG. 5. The idea of the algorithm is: gridding a studied traffic cell; mapping cell phone signaling trajectory points according to time sequence into a studied traffic cell grid; calculating user's continuous residence time in each grid; determining whether time difference between time the user leaves the grid and time the user arrives at the grid is greater than the time threshold; and if the time difference is greater than the time threshold, determining the data to be residence data, and otherwise determining the data to be travel data. For the residence data, a concept of points of interest (POI) is introduced, the POI is captured by Baidu to obtain information including name, type, latitude and longitude to further analyze the user's residence area and residence purpose, for subsequent study of the user's travel behavior.

The specific pseudo-code of the grid clustering algorithm that fuses spatio-temporal features is shown in Table 1, and the specific steps for its implementation are:

1) gridding the studied traffic cell, and mapping the user trajectory point data into the studied traffic cell grid according to the time sequence;

2) defining the pre-processed signaling dataset as userData, a center latitude and longitude of the gird being gridSizeLng, gridSizeLat respectively, and setting the time threshold to be T;

3) initializing all data groups, and sequentially determining whether the pre-processed data are all in the grid, if the pre-processed data are all in the grid, adding the trajectory point to a grid cluster group, if the pre-processed data are not all in the grid, adding the trajectory point to a grid cluster_all group to distinguish between the two data, and then continuing to determine a next trajectory point until all the data are all determined; and 4) if the data within the grid cluster is within the grid cluster_all group and time difference between time the trajectory point leaves the grid and time the trajectory point arrives at the grid is greater than the time threshold T, determining the data to be stay data and adding the data to a stayCluster group, to obtain the resident's staying point data.

TABLE 1 pseudo-code of grid clustering algorithm that fuses spatio-temporal features
algorithm1: grid density clustering algorithm that fuses spatio-temporal features

```
Input: the pre-processed cell phone signaling datase userData , center latitude of the gird
being gridSizeLng , center longitude of the gird being gridSizeLat , time threshold T
Output: stayCluster
  1   function DataToStay (userData)
  2   cluster _all = [ ], cluster = [ ], stayCluster = [ ], i = 0 // it is empty after initialization
  3   while (i < length(userData)−1) do:   // determine user trajectory points sequentially
  4       if x_{i+1} in (x_i +gridSizeLng) and y_{i+1} in (y_i +gridSizeLat) : //if the latitude and longitude
  coordinates of the trajectory point are in the grid
  5               cluster.append([x_{i+1}, y_{i+1}, t_{i+1}]) //add the point into the grid cluster
  6           else:   //if there is not
  7               cluster _all.append(cluster)
  8               cluster = [ ]
  9               i = i + 1 //continue to the next trajectory point
  10      end while
```

TABLE 1-continued pseudo-code of grid clustering algorithm that fuses spatio-temporal features
algorithm1: grid density clustering algorithm that fuses spatio-temporal features

```
11    for cluster in cluster _all :
12            if computeTimeDiffer (cluster[0], cluster[−1]) > T : // if time difference between time the
trajectory point leaves the grid and time the trajectory point arrives at the grid is greater than the time
threshold T
13    stayCluster.append(cluster) // add the trajectory point to staycluster
14    end for
15    return stayCluster //the return result is the resident's staying point data
16    end function
```

The third part is to reconstruct the signaling user trajectory, on the basis of the identification of the staying point of the user in the previous section, combined with the road network data collected by Baidu Maps to analyze the user's behavior, the user's staying area and the staying purpose is analyzed specifically according to the user's POI data. To facilitate the analysis of the user's subsequent travel behavior, the user's trajectory can be divided into a number of sub-trajectories at equal distances, and then the user's travel data characteristics is clustered for analysis in each sub-trajectory, to identify the user's travel mode. The user's trajectory is reconstructed into multiple sub-trajectories, and finally a multi-dimensional feature matrix is established to facilitate the analysis of the user's subsequent travel behavior.

Figure 6:
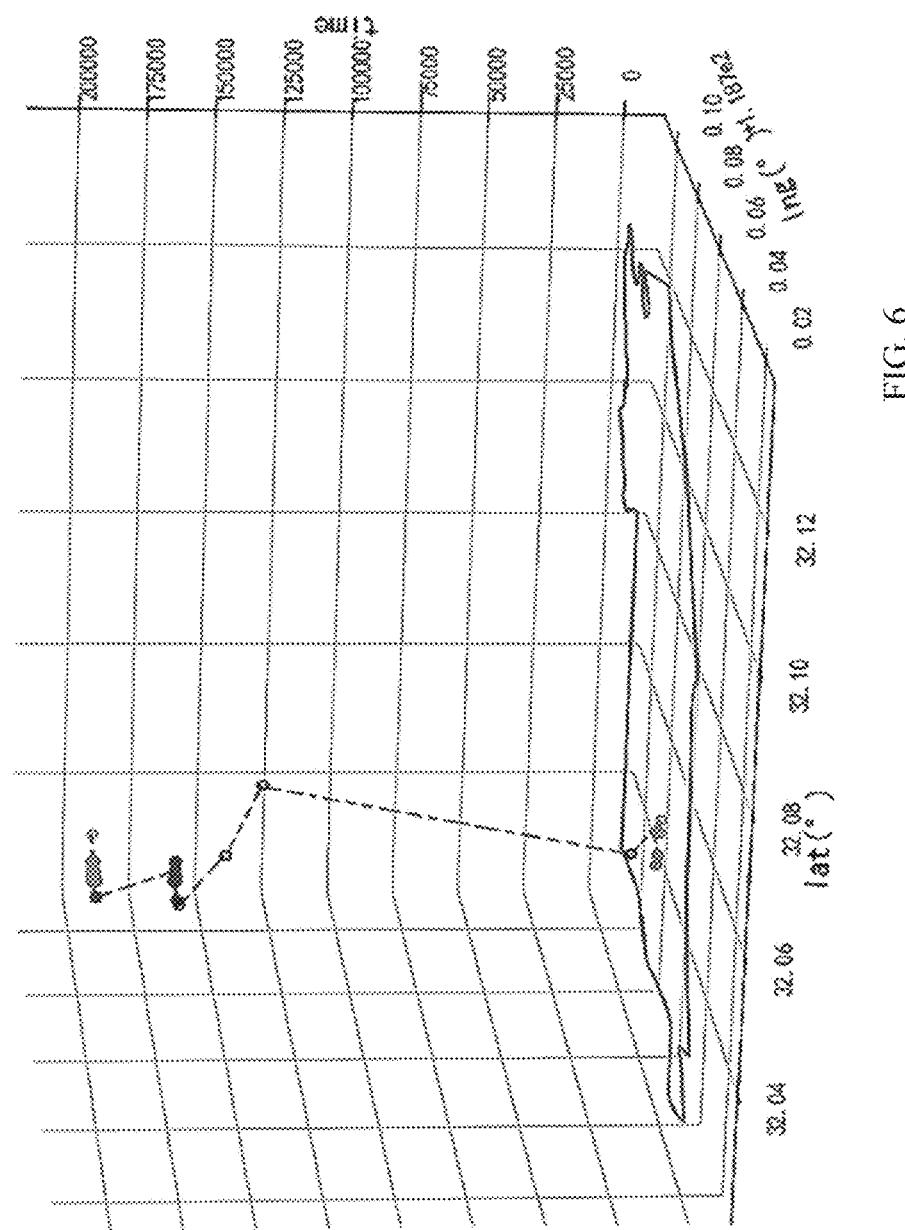
FIG. 6 is a diagram of the recognition results of the staying behavior and non-staying behavior of a signaling user after being processed by the algorithm proposed in the present patent.

The second part of the module is to use the grid clustering algorithm that fuses spatio-temporal features to identify the signaling user's staying point, i.e., the user's trajectory is mapped to the grid of the studied traffic cell, and the size of the grid is required to be centered on the base station, with the coverage of the base station as the side length. FIG. 6 is a three-dimension spatial movement trajectory effect diagram of a signaling user after being processed by the algorithm proposed in the present application, where the Z axis represents the time sequences $t_i$ of the signaling data, the solid dots represent stays, and the hollow dots represent non-stays. As can be seen from the figure, stay cluster 1 and stay cluster 2 indicate that the signaling user has engaged in a stay behavior, while movement clusters 1, 2, 3, 4, 5, 6 indicate that the signaling user has engaged in a non-stay behavior.

Each trajectory point of the user is represented with a triple $(x_i, y_i, t_i)$, wherein $(x_i, y_i)$ represents the user's positional information and its value is latitude and longitude, respectively, and $t_i$ is a timestamp, and the user's complete travel trajectory or spatio-temporal sequence is a data sequence Traj composed of several triples:

$$Traj = (x_0, y_0, t_0), (x_1, y_1, t_1), \ldots (x_i, y_i, t_i), \ldots (x_n, y_n, t_n) \quad (1)$$

where $\forall 0 < i < n$, $t_i < t_{i+1}$ indicates that the user's trajectory point data is sorted in ascending order of timestamps.

Since the signaling data is used to infer the current location of the signaling user by generating an information interaction with a nearby base station, the user's staying area is mostly manifested as the phenomenon of the user wandering back and forth, staying and oscillating in a certain area. The idea of the grid clustering algorithm proposed in the present application is to extract the temporal and spatial characteristics of signaling data according to the characteristics of cell phone signaling oscillating noise and staying or wandering in a certain range, and to use the proposed algorithm to cluster signaling data from the temporal and spatial dimensions, and when clustering the spatial dimension, the size of the grid has a great impact on the clustering effect, so when clustering from the spatial dimension, the center of the grid clustering Cluscen needs to be constantly adjusted to minimize the effect of size of the grid on the clustering results.

$$Cluscen = \frac{\sum_{i=1}^{J} (x_i, y_i, t_i)}{J} \quad (2)$$

Where $i \leq J$, $(x_i, y_i, t_i)$ denotes the triple data of the ith trajectory point, J represents the total number of grids.

If the center of the grid clustering is used to represent the staying point of the signaling user, it can be clearly seen from FIG. 7 that the algorithm proposed in the present application can accurately identify the staying point of the user. Similar to FIG. 6, where the X axis represents the time sequences $t_i$ of signaling data, solid dots represent stays, and hollow dots represent non-stays, it can be seen that the center of stay cluster 1 and the center of stay cluster 2 in FIG. 7.

Finally, based on the identification of the staying point of the signaling users, its trajectory is reconstructed, and the reconstructed user trajectory map is shown in FIG. 6. The results show that the proposed algorithm of the present application improves the accuracy of the identification of the staying points of the signaling users, thus improving the accuracy of the reconstructed trajectory data, and laying a solid foundation for the subsequent further analysis of the user's travel behavior.

For a problem that the low positioning accuracy of cell phone signaling data leads to frequent switching of users' staying points in the same base station coverage area, The present application proposes a grid clustering algorithm that fuses spatio-temporal features, and adds user's point-of-interest data for analysis, and realizes the identification of staying behaviors by constraining the grid users from the spatio-temporal two dimensions; moreover, when analyzing the user's travel behavior of the signaling data, a trajectory reconstruction method based on staying points is proposed to reconstruct the trajectory of the signaling user into a plurality of sub-trajectories based on staying points to further analyze the user's behavior subsequently.

The above is an exemplary embodiment of the present application, and is not intended to limit the scope of the present application, and any equivalent structure or equivalent process transformation using the specification and the accompanying drawings of the present application, or direct or indirect application in other related technical fields, are all reasonably included in the scope of the present application.

The invention claimed is:

1. A high-precision spatio-temporal trajectory recovery method based on cell phone signaling data, applied to a computer, comprising:

using a density-based spatial clustering of application with noise (DBSCAN) to remove discrete point, using a rule-based method to remove ping-pong data which is data generated during Ping-pong handover, and using a grid clustering algorithm that fuses spatio-temporal features to identify a staying point of the user, the method further comprising:

pre-processing original signaling data by using a data pre-processing method based on the DBSCAN;

using the grid clustering algorithm that fuses the spatio-temporal features to identify the staying point of the user; and after identifying the staying point of the user, removing an identified staying point, and further reconstructing an user trajectory;

wherein the pre-processing original signaling data collected by using the data pre-processing method based on the DBSCAN comprises:

selecting a complete travel record of a user, and marking missing data as 0 point; in response to that there is the 0 point, determining whether a previous timestamp record of the 0 point and a next timestamp record of the 0 point are equal, and in response to that they are equal, deleting the 0 point, and in response to that they are not equal, replacing the 0 point with an average value of the previous timestamp record and the next timestamp record;

after deleting the 0 point, processing drift data by using the DBSCAN, and processing the ping-pong data by using the rule-based method, and removing the drift data by a method of setting a time window; wherein the drift data is anomalous positioning data due to a device's inability to connect to a nearest base station, and the drift data is usually not in the same or neighboring grid with a previous trajectory point, which is manifested by the inability of the previous trajectory point to continue backward in a grid;

in response to that a first trajectory point that cannot continue to be linked backward, and there is a second trajectory point that continue to be linked backward within the time window of a downward direction of the first trajectory point; removing all trajectory points between the first trajectory point and the second trajectory point, wherein all trajectory points between the first trajectory point and the second trajectory point are the drift data, otherwise continuing downward to search by the time window with the previous trajectory point of the first trajectory point a reference;

for the ping-pong data, gridding a studied cell, mapping remaining trajectory points after drift data processing into a grid, setting a time threshold according to characteristics of the ping-pong data that jumps rapidly between neighboring base stations, and in response to that the trajectory points in the grid jumps between two base stations and a time interval for the jump is less than the time threshold, determining the trajectory point to be the ping-pong data and removing the ping-pong data;

wherein the using the grid clustering algorithm that fuses the spatio-temporal features to identify the staying point of the user comprises:

gridding a studied traffic cell;

mapping cell phone signaling trajectory points according to a time sequence into a studied traffic cell grid;

calculating user's continuous residence time in each grid;

determining whether time difference between time the user leaves the grid and time the user arrives at the grid is greater than the time threshold; and in response to that the time difference is greater than the time threshold, determining the data to be residence data, and otherwise determining the data to be travel data;

wherein for the residence data, a concept of points of interest (POI) is introduced, the POI is captured by Baidu to obtain information comprising name, type, latitude and longitude to further analyze purpose why the user resides, for subsequent study of the user's travel behavior;

wherein the grid clustering algorithm that fuses the spatio-temporal features comprises:

gridding the studied traffic cell, and mapping the user trajectory point into the studied traffic cell grid according to the time sequence;

defining the pre-processed signaling dataset as userData, a center latitude and longitude of the gird being gridSizeLng, gridSizeLat respectively, and setting the time threshold to be T;

initializing all data groups, and sequentially determining whether the pre-processed data are all in the grid, in response to that the pre-processed data are all in the grid, adding the trajectory point to a grid cluster group, in response to that the pre-processed data are not all in the grid, adding the trajectory point to a grid cluster all group to distinguish between the two data, and then continuing to determine a next trajectory point until all the data are all determined; and in response to that the data within the grid cluster is within the grid cluster all group and time difference between time the trajectory point leaves the grid and time the first trajectory point rives at the grid is greater than the time threshold T, determining the data to be stay data and adding the data to a stayCluster group, to obtain the resident's staying point;

wherein in an operation of the after identifying the staying point of the user, removing the identified staying point, and further reconstructing an user trajectory, on a basis of the identification of the user's staying point, analyzing the user's behavior by combining road network data collected by Maps, and analyzing the user staying area and staying purpose according to the user's POI data, to facilitate the analysis of the user's subsequent travel behavior;

dividing the user trajectory into multiple sub-trajectories at equal distances; and determining a travel mode of the user by clustering the user's travel data within each sub-trajectory.

2. The high-precision spatio-temporal trajectory recovery method based on cell phone signaling data according to claim 1, wherein the processing the discrete point by the DBSCAN density clustering algorithm comprises:

arbitrarily selecting a trajectory point p;

finding all trajectory points where eps and minPts densities are reachable from the trajectory point p;

in response to that the trajectory point p is a center point, forming a cluster; in response to that the trajectory point p is a boundary point, there is no object where the density is reachable from the trajectory point p, using the DBSCAN continuedly to access other trajectory points in a dataset; and continuing this process until all trajectory points in the dataset have been processed.

3. The high-precision spatio-temporal trajectory recovery method based on cell phone signaling data according to claim 1, wherein in an operation of the using the grid clustering algorithm that fuses the spatio-temporal features to identify the staying point of the user, each trajectory point 5 of the user is represented with a triple $(x_i, y_i, t_i)$, wherein $(x_i, y_i)$ represents the user's positional information and its value is latitude and longitude, respectively, and $t_i$ is a timestamp, and the user's complete travel trajectory or spatio-temporal sequence is a data sequence Traj composed 10 of several triples:

$$Traj = (x_0, y_0, t_0), (x_1, y_1, t_1), \dots (x_i, y_i, t_i), \dots (x_n, y_n, t_n) \quad (1)$$

15 where $\forall 0 < i < n, t_i < t_{i+1}$ indicates that the user's trajectory point is sorted in ascending order of timestamps.

\* \* \* \* \*

20